C. VOLKMANN.
COTTON PICKER.
APPLICATION FILED OCT. 8, 1910.
1,184,795.
Patented May 30, 1916.
5 SHEETS—SHEET 1.
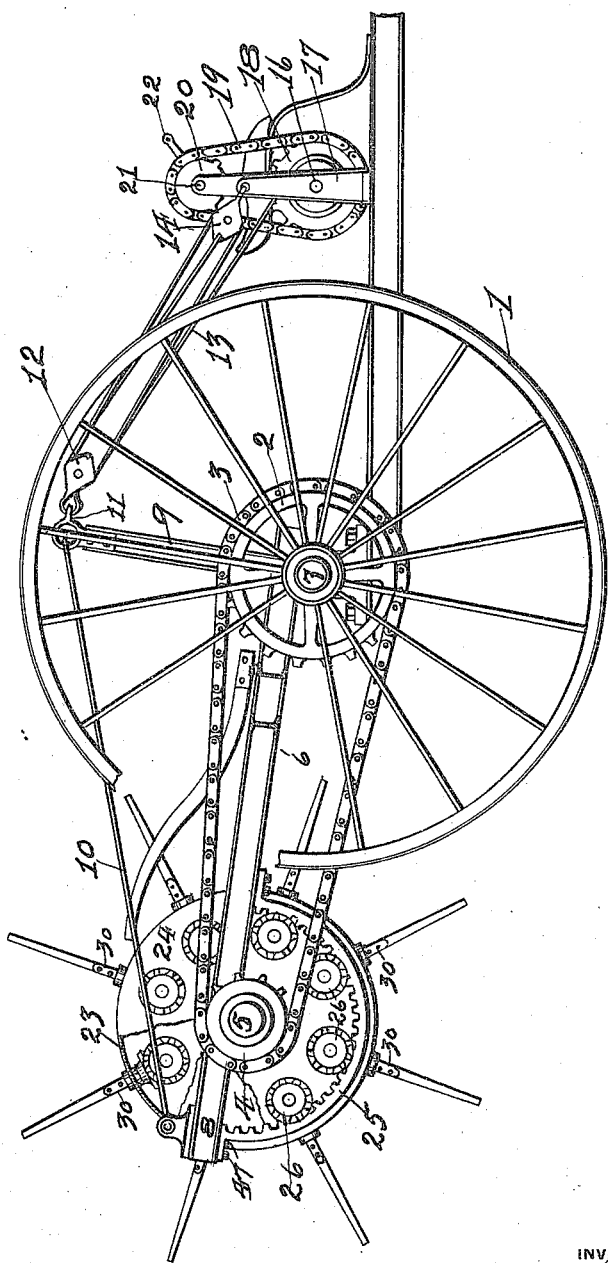

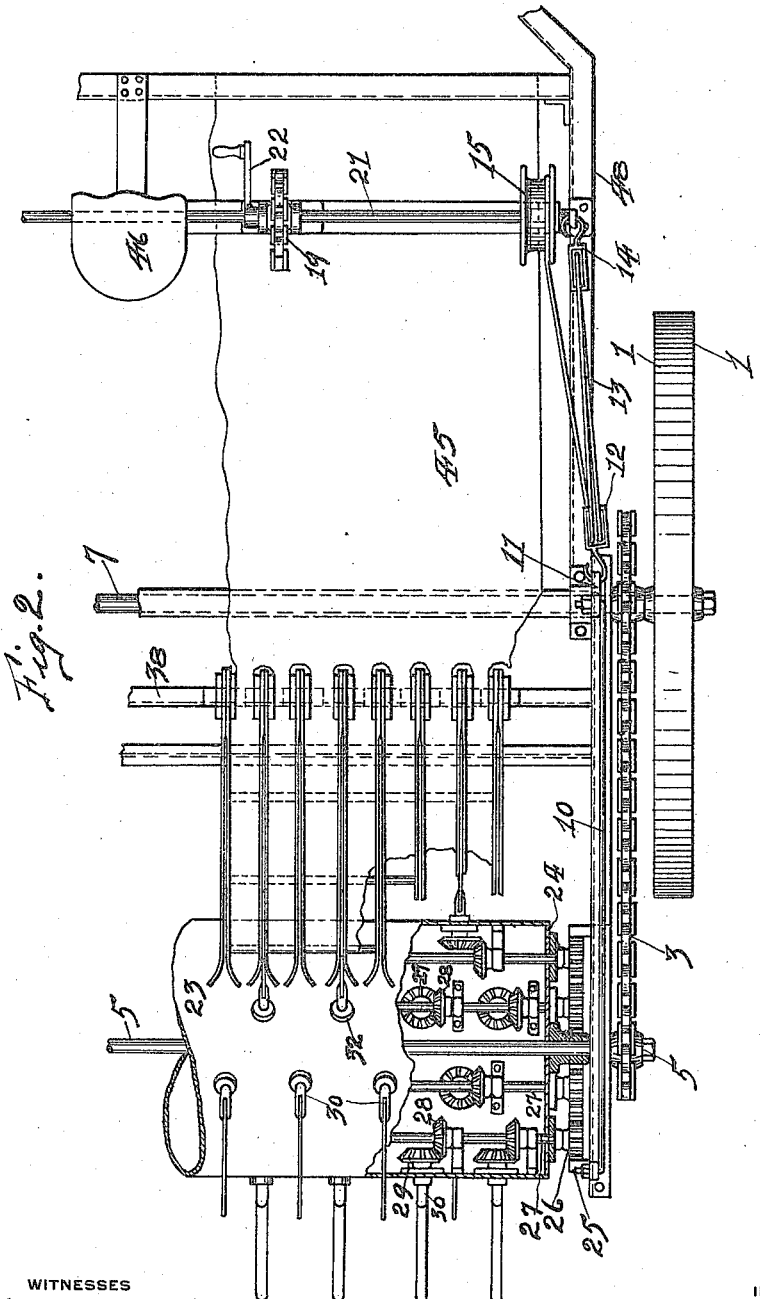

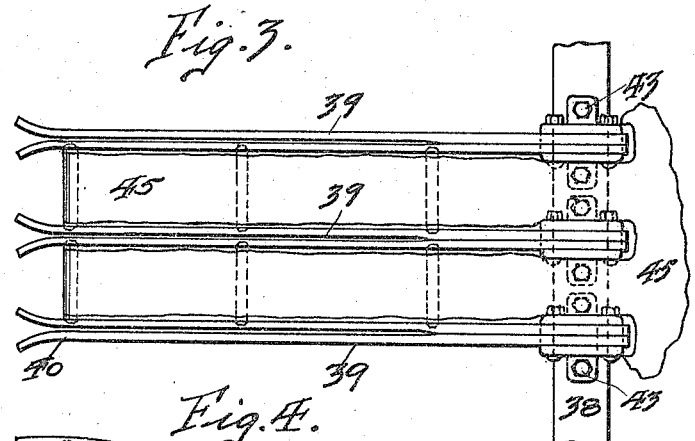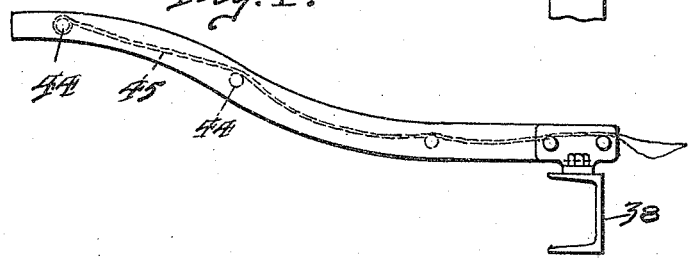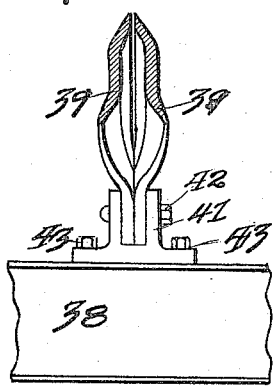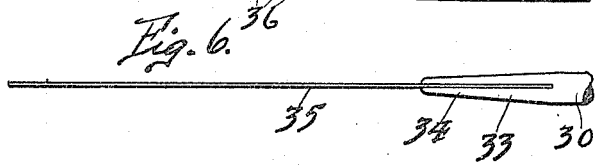

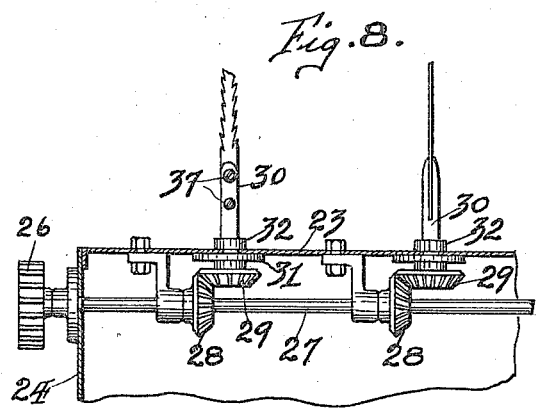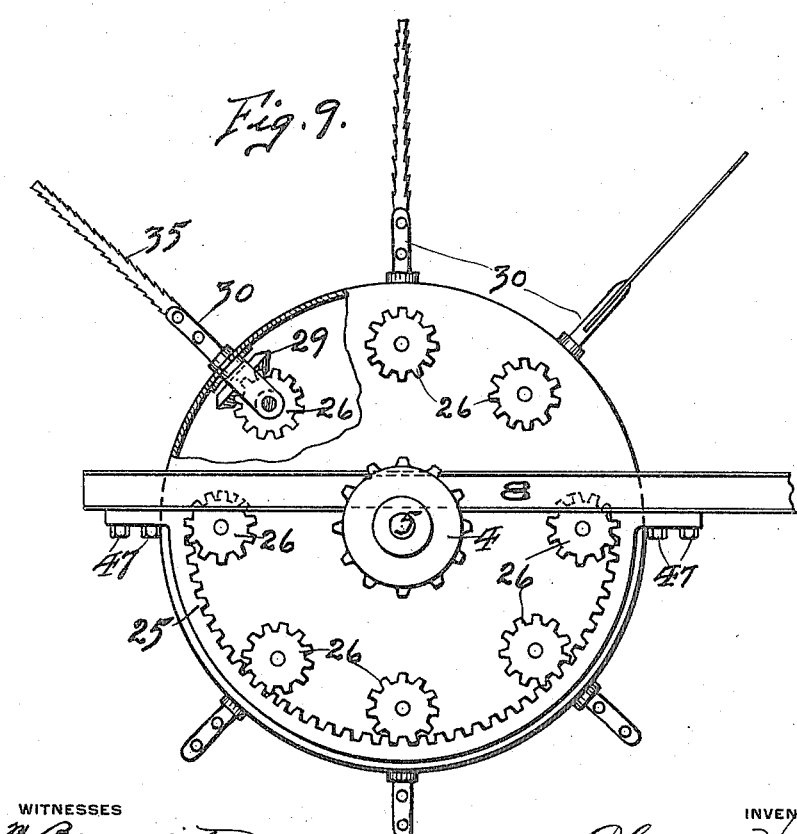

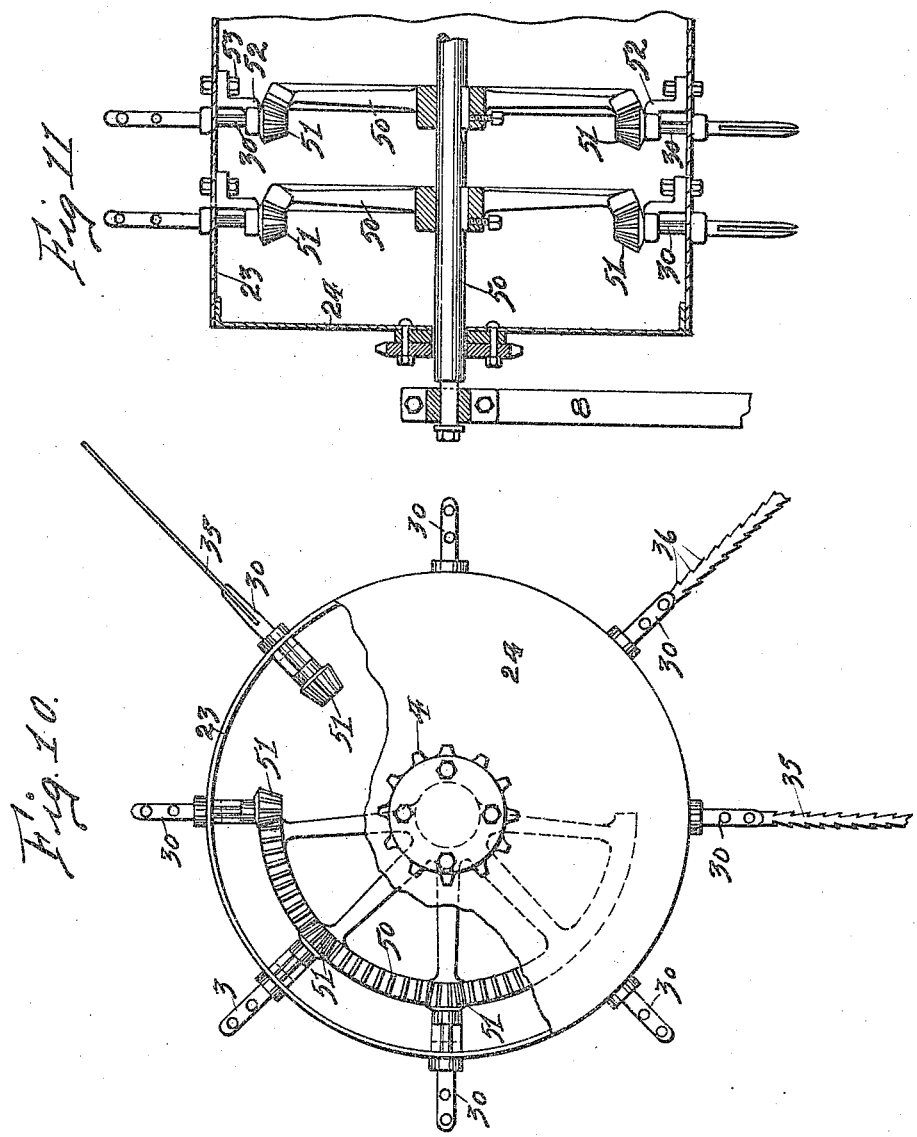

UNITED STATES PATENT OFFICE.

CHARLES VOLKMANN, OF CHICAGO, ILLINOIS.

COTTON-PICKER.

1,184,795.  Specification of Letters Patent.  Patented May 30, 1916.

Application filed October 8, 1910. Serial No. 585,912.

*To all whom it may concern:*

Be it known that I, CHARLES VOLKMANN, a citizen of the United States, residing at Chicago, county of Cook, and State of Illinois, have invented a certain new and useful Improvement in Cotton-Pickers, of which the following is the specification.

My invention relates to that class of pickers in which the picking spindle is rotated, and has for its object to produce a new picking spindle and a new stripper for the same. Machines of this character with which I have been familiar have been subjected to the objection that the strippers fail to clean the picker in many instances, with the result that the teeth of the pickers shortly become covered with lint and cease to be operative. Other devices are injurious to the plants.

My invention has for its further object to provide a picker which may be adjusted to the various heights of plants and which will operate without injury, either to the plants or to the unripe bolls, and has for its further object to accomplish the above in a simple and inexpensive manner.

My means for accomplishing the above objects may be more readily understood by having reference to the accompanying drawings which are hereunto annexed and are a part of this specification, in which:

Figure 1. is a side elevation of part of my improved picker, the end of the picking frame being partially broken away to show the interior construction. Fig. 2. is a top or plan view of the device partly in section. Figs. 3 and 4 are fragmentary detail views of the strippers and the cloth or canvas for catching the picked cotton. Figs. 5 and 6 are enlarged detail views of one of the pickers. Fig. 7 is a detail view partly in section. Figs. 8 and 9 are enlarged detail views showing the operating mechanism for handling the pickers. Figs. 10 and 11 are enlarged detail views showing modified form of mechanism for accomplishing that result.

Similar reference numerals refer to similar parts throughout the entire description.

As shown in the drawings my machine is mounted upon a pair of wheels 1 (only one of the wheels being shown); upon the hub of the wheel is mounted a sprocket 2 which carries a chain 3 running over a sprocket 4 rigidly attached to a shaft 5 which is carried by a sub-frame which is rotatably mounted upon the axle 7 and upon which is secured the wheel 1. The sub-frame consists of an outwardly extending member 8 and an upright member 9, the two being tied together with a rod 10. The member 9 is provided at its end with a loop 11 to which is secured a block 12, through which passes a cable 13, one end of which is secured to a block 14, the other end being attached to a pulley 15 which is rigidly attached to an axle 16 which is journaled in a standard 17 and has fixedly attached thereto, a sprocket 18 which carries a chain 19 over a sprocket 20 which is fixedly secured to a shaft 21. The end of the shaft 21 has mounted thereon, a crank 22, thereby permitting the operator to adjust the position of the sub-frame to any required height. Upon the shaft 5 is mounted a drum 23. This drum is cylindrical in form and is provided with heads 24 through which project the ends of a plurality of shafts 27, said shafts having secured to the ends thereof, the spur gears 26 which mesh with the teeth of a semicircular rack 25 during one-half of the rotation of the drum 23. This rack 25 is secured to the frame 8 by means of bolts 47, or in any other suitable or convenient manner. At regular intervals miter gears 28 are secured to the shafts 27, the teeth of these miter gears 28 meshing with miters 29 which are secured to the end of the stub shafts 30, the other ends of which project beyond the surface of the drum 23. Suitable collars are provided to prevent the endwise movement of the stub shafts 30. These stub shafts are formed, as better seen in the detail views Figs. 5 and 6, with an outwardly tapering end 33 which is provided with a slot 34 adapted to receive a flat metal blade 35. This blade is formed with a plurality of teeth or serrations 36 upon its edges and is detachably secured to the stub shaft 30 by means of set screws 37. In this way I provide for the easy replacement of the picking blade in the event of its being broken away or badly bent. A beam 38 is secured to the sub-frame and upon the beam 38 I mount a plurality of stripping blades 39. These blades are arranged in pairs and are provided with flaring portions 40 at their outer extremities, each pair being held with a lug 41 by means of bolts 42, the lug 41 being secured to the beam 38 by means of bolts 43 or in any other suitable or convenient manner. At intervals, between the pairs of strippers 39, I place a number of pins 44 which serve the double purpose of holding the strippers to their work and also furnish the support upon which to mount the cloth or canvas 45 which extends intermediate the stripping blades, and from thence forward to the front part of the machine, so that the cotton stripped from the pickers will be carried to the forward part of the machine. A suitable seat 46 for the driver is provided adjacent the handle of the crank 22, the same being mounted upon a frame 48 which is arranged in the usual manner to provide means for hitching the teams thereto to draw it over the fields.

Figs. 10 and 11 show a modified form for causing the rotation of the stub shafts 30 and the pickers 35. In this form of construction, a plurality of segments 50 are mounted upon the shaft 5 corresponding to the rows of pickers. These segments are provided with bevel teeth which mesh with the teeth of the bevel gears 51 mounted on the inner ends of the stub shafts 30. Where this construction is utilized, a bearing 52 is arranged for the stub shafts 30 and is secured to the drum 23 by means of bolts 53 or in any other suitable or convenient manner.

It will be obvious from the foregoing description that this form of construction serves to produce an intermittent rotation of the pickers as effectually as the form shown in the other figures and in some cases may be found more convenient.

The operation of the device is as follows: The operator, by means of a crank 22, rotates the pulley 15, thereby raising or lowering the frame 6 so as to have the drum 23 at the height suitable for the rows of cotton which are to be picked. Starting the machine over the fields, the rotation of the axle 7 through the medium of the chain 3 causes the drum 23 to rotate, and the pickers 35, projecting from the periphery of the drum, enter the plants with a forward, downward motion; at the moment that they engage the plants, the spur gears 26 are brought in contact with the teeth of the semicircular rack 25 and this through the medium of the shaft 27 and the miter gears 28 and 29 causes the pickers to be rotated and the serrations thereon engage the ripe cotton and wind it upon the pickers 35; when they reach the height to clear the bushes the spur gears leave the rack and cease to revolve so the pickers remain stationary also. The continued rotation of the drum 23 brings the end of the stub shafts 30 in contact with the flaring ends 40 of the stripper 39, thus insuring their being between the pair of blades. Should the flat part of the blade not be turned in the right direction, the pressure exerted by the pair of stripping blades will serve to turn it to the correct position, and the continued rotation of the drum brings it down with a forward motion, the pressure of the stripping blades thus serving to effectually strip all of the cotton from the teeth or serrations upon the edges of the pickers so that when they leave the strippers they present teeth which are not clogged in the slightest degree with any fragments of cotton and are all ready to repeat the operation. By making the blades flat and slightly flexible, the rotation of them causes a whipping motion which agitates the bushes so as to cause all of the ripe cotton to be moved sufficiently to bring the projecting part of the ripe cotton in contact with some one of the blades, thus insuring the picking of all of the ripe cotton; at the same time the pickers are sufficiently flexible to avoid injuring the green bolls.

Having described my invention what I regard as new and desire to secure by Letters Patent, is:

In a cotton picker, a frame, wheels supporting the frame, picking arms, said picking arms being supported by a drum, means in the drum for rotating said picking arms, stripping blades comprising a plurality of pairs of curved bars, the bars of each pair being spaced apart to provide a clearance for the picking arms, the bars being wider than the width of the space between the arms of the respective pairs of stripping blades, the forward portions of the arms of each stripping blade extending outwardly to provide a guide for the picking arms, and endless carriers positioned between the respective pairs of stripping blades for receiving material gathered by the picking arms.

CHARLES VOLKMANN.

Witnesses:
C. M. BAUMEISTER,
H. L. COWAN.

Copies of this patent may be obtained for five cents each, by addressing the "Commissioner of Patents, Washington, D. C."